United States Patent [19]

Beck

[11] 4,353,061

[45] Oct. 5, 1982

[54] APPARATUS AND METHOD FOR PROVIDING ELECTRON BEAM PATTERNS USING EXPANDED BEAM ARRAY

[75] Inventor: Vernon D. Beck, Ridgefield, Conn.

[73] Assignee: International Business Machines, Armonk, N.Y.

[21] Appl. No.: 101,337

[22] Filed: Dec. 7, 1979

[51] Int. Cl.[3] .............................................. G06F 3/14

[52] U.S. Cl. .................................... 340/720; 340/736; 340/744; 178/30; 315/365; 313/413

[58] Field of Search .................. 178/30; 340/720, 736, 340/744, 733; 315/365; 313/86

[56] References Cited

U.S. PATENT DOCUMENTS

| | | | |
|---|---|---|---|
| 2,862,144 | 11/1958 | McNaney | 315/365 |
| 3,157,456 | 11/1964 | Kikuchi | 178/30 |
| 3,503,063 | 3/1970 | Starr | 340/744 |
| 3,600,624 | 8/1971 | Gleichauf | 313/86 |
| 3,673,448 | 6/1972 | Nakamura | 313/86 |
| 3,740,603 | 6/1973 | Kuhn | 313/86 |

OTHER PUBLICATIONS

*Analog to Digital Circuitry is Out With New Display Tube* Electronics; vol. 43, #12, Jun. 8, 1970; p. 61.

*Primary Examiner*—Marshall M. Curtis
*Attorney, Agent, or Firm*—Pollock, Vande Sande & Priddy

[57] ABSTRACT

An apparatus and method for forming scanned electron beam patterns which finds particular use in multiple beam cathode ray tubes. Instead of using the vertical line array of electron beam sources which is used in conventional multiple beam tubes, a two dimensional expanded beam array is provided. The expanded array is such that no two electron beams in the array are disposed in the same scan line and it is of a geometric shape having comparable length and width dimensions. In order to form characters or other patterns logic circuitry is provided to control each beam of the expanded array at respective scanning positions as the array is deflected or scanned across the screen of the cathode ray tube.

16 Claims, 9 Drawing Figures

EXPANDED BEAM ARRAY

EXPANDED BEAM ARRAY

APPARATUS AND METHOD FOR PROVIDING ELECTRON BEAM PATTERNS USING EXPANDED BEAM ARRAY

FIELD OF THE INVENTION

The present invention is directed to an apparatus and method for forming scanned electron beam patterns and finds particular use in multiple beam cathode ray display tubes.

BACKGROUND OF THE INVENTION

Such multiple beam display tubes are frequently used to display alphanumeric and/or other visual pattern information. Typically, the tubes utilize a plurality of closely spaced electron beams which are arranged in a single vertical column array. The beams are deflected together across the screen and are repeatedly turned on and off so as to form "dots" on the screen at respective scanning positions. In order to form desired characters or other patterns, logic circuitry selectively controls each beam at each scanning position and the resulting arrangement of "dots" forms the desired pattern. Such multiple beam cathode ray tubes have greater bandwidth than single beam tubes, which enables them to display more information at suitable brightness than the single beam type.

The conventional multi-beam tube described above, however, suffers from several problems. First, because the beams are very close together and actually may touch each other, mutual repulsion results, which may cause the top and bottom beams to be deflected upwardly and downwardly respectively when the beams are turned on. Second, since the beams are located very close to each other there is little space to build and mount the grids which control the intensity of the beams. While making the beams smaller in diameter might help this problem, reduction in beam size cannot be accomplished without a corresponding dimunition in beam brightness. A third problem which exists with the conventional straight line beam array is beam intermodulation. That is, because of the closeness of the beams, the control grid of one beam may affect or intermodulate the current of another beam, thereby diminishing effective grid control.

SUMMARY OF THE INVENTION

It is therefore an object of the invention to provide an improved apparatus and method for forming a scanned electron beam pattern. It is another object of the invention to provide an improved apparatus and method for forming a scanned electron beam pattern in a multiple beam cathode ray tube. It is another object of the invention to provide a multiple beam cathode ray tube in which beam repulsion problems are minimized. It is another object of the invention to provide a multiple beam cathode ray tube in which there is more room to build and mount the beam control grids. It is another object of the invention to provide a multiple beam cathode ray tube which does not suffer from beam intermodulation. It is another object of the invention to provide a multiple beam cathode ray tube which may utilize more current per beam than a tube which utilizes a vertical column array of electron beams.

The above objects are accomplished in accordance with the present invention by providing a novel two-dimensional array of electron beams in which each beam is disposed on a different scan line and having comparable "length" and "width" dimensions. The beams are deflected or scanned across the screen while repeatedly being turned on and off to define a series of "dots" on the screen at sequential scanning positions. In order to form a pattern each beam is selectively controlled at each scanning position, and the resulting configuration of "dots" forms the desired pattern.

In an illustrative embodiment the specific array of electron beams utilized is approximately symmetrical about a center point or centroid, and the array, for instance, may be square in shape with an equal or unequal number of beams beng disposed in mutually perpendicular directions.

The logic means for selectively controlling each beam at respective scanning positions may include read only memory means. In an illustrative embodiment, the memory means stores information for each of a plurality of pre-known patterns indicative of whether each of a hypothetical group of beams equal in number to the number of beams in the array being used but arranged in a hypothetical straight line array should be on or off at each of the scanning positions. Additionally, a delay means corresponding to each beam is provided for delaying a beam on-off signal determined by means including the read only memory means for a number of scanning positions dependent on the offset or displacement of respective beams being used from the hypothetical positions of corresponding beams in the hypothetical straight line array.

BRIEF DESCRIPTION OF THE DRAWINGS

The invention will be better understood by referring to the accompanying drawings in which:

FIG. 9 may be utilized in connection with FIG. 8 to better understand the operation of the logic shown.

DETAILED DESCRIPTION OF PREFERRED EMBODIMENTS

Figure 1:
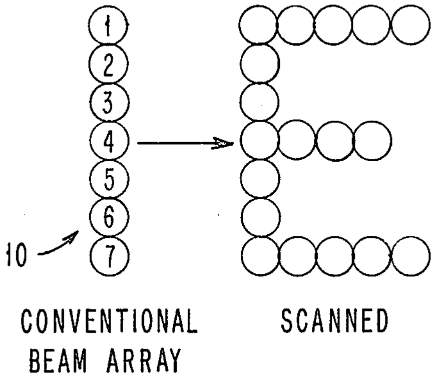
FIG. 1 is a schematic representation of a vertical line array of electron beam sources such as is used in a conventional multiple beam cathode ray tube. The Figure also shows a schematic representation of the exemplary letter E, which may be formed when the beams are deflected while being turned on and off.

Referring to FIG. 1, conventional vertical column electron beam array 10 is shown. As can be seen, the beams are typically quite close to each other and may actually be touching. As employed in a conventional multiple beam cathode-ray tube, the beams are focussed onto the screen of the tube and are deflected as a group thereacross. As the beams are deflected they are repeatedly turned on and off by varying voltage on the control grid, and therefore form "dots" on the screen at respective scanning positions. In order to form alphanumeric characters or other patterns, appropriate logic circuitry selectively causes each of the beams to be on or off at each respective scanning position, and the resulting configuration of "dots" forms the character or other picture.

An exemplary alphanumeric character which may be formed, the letter E, is illustrated in FIG. 1. With the exemplary seven beam vertical array shown in the Figure, it can be observed that the vertical line of the E is comprised of seven "dots," and the upper, lower, and center horizontal lines are comprised of five "dots," five "dots" and four "dots" respectively.

Figure 2:
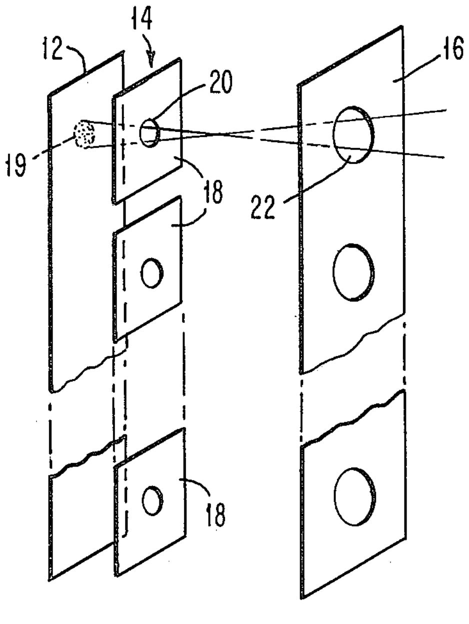
FIG. 2 is a schematic representation, partly broken away, of a typical cathode-grid structure which may be used in a conventional multiple beam cathode ray tube.

FIG. 2 is a schematic illustration of a typical cathode-grid structure for producing the array of beams shown in FIG. 1. It is comprised of sheet cathode 12, control grid array 14, and shielding grid 16. The structure shown in FIG. 2 is partly broken away and only a portion of the components which are necessary for producing the seven beams shown in FIG. 1 is illustrated.

Each of the control grids of control grid array 14, such as grid 18, is comprised of a plane metallic element having an aperture such as aperture 20, disposed therein. Shielding grid 16 is comprised of a single longitudinally extending plane metallic element having a plurality of apertures, such as 22, each aperture being slightly larger and directly in front of the corresponding aperture in the elements of control grid 14.

When the sheet cathode 12 is heated, electrons are emitted from its entire surface. When the control grid to cathode voltage is positive, the electrons emitted by the cathode are attracted to the grid elements and pass through the apertures therein, being focussed slightly in front of the respective apertures and continuing through the apertures in shielding grid 16.

The conventional multiple beam cathode ray tube type using the array shown in FIG. 1 and cathode-grid structure similar to that shown in FIG. 2 may be superior to the single beam cathode ray tube type for alphanumeric and other display applications. However, as mentioned above, the tube suffers from several problems.

First, because the beams are very close together and may actually touch each other, mutual beam repulsion results, which may cause the top and bottom beams to be deflected upwardly and downwardly respectively when the beams are turned on. Second, as may be appreciated by referring to FIG. 2, since the beams are located very close to each other, there is little space to build and mount the grids which control the intensity of the beams. Third, the closeness of the beams places an effective limit on the amount of current which each beam may contain and also results in beam intermodulation, wherein the control grid of one beam may affect or intermodulate the current of another beam, thereby precluding effective grid control. The above problems are obviated by the present invention, which provides an expanded electron beam array instead of the line array shown in FIG. 1, and which utilizes electronic logic and timing means to effectively "de-skew" the beams of the expanded array.

Figure 3:
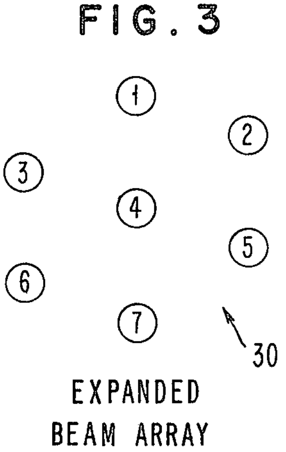
FIG. 3 is a schematic representation of an expanded beam array in accordance with an embodiment of the present invention.
Figure 4:
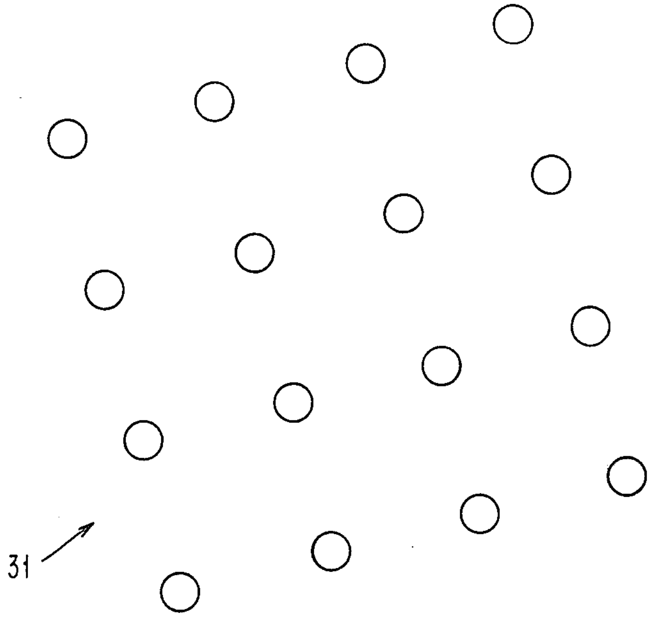
FIG. 4 is a schematic representation of an expanded electron beam array in accordance with a further embodiment of the present invention.
Figure 5:
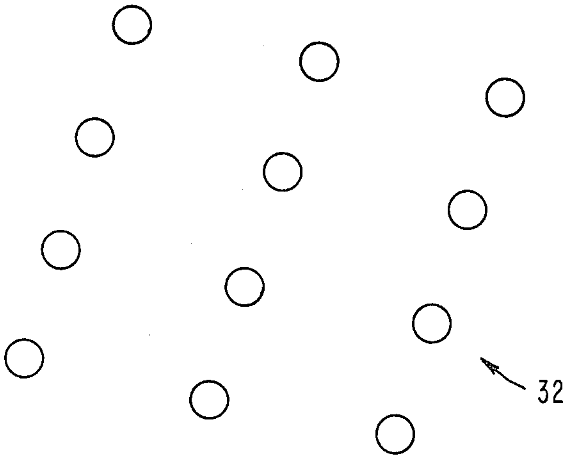
FIG. 5 is a schematic representation of an expanded beam array in accordance with still a further embodiment of the present invention.

FIGS. 3 to 5 show illustrative embodiments of expanded arrays in accordance with the invention. In each case, the two dimensional arrays have each of the beams disposed on a different scan line and have "length" and "width" dimensions which are of comparable size. As applied to arrays of arbitrary geometric shape the term "length" is intended to mean the dimension along a line connecting the two points on the outline of the shape which are the furthest from each other, and the term "width" is intended to mean the dimension along a line which is the prependicular bisector of the "length" and which connects two other points on the outline of the geometric shape.

Referring to FIG. 3, an approximately hexagonal array utilizing seven beams is shown. The beams are numbered by scan line or "row," with the numbers corresponding to the beam numbers used in FIG. 1. To display the letter E with the expanded array of FIG. 3, deflection of beam No. 1 forms the top stroke, deflection of beam No. 7 forms the bottom stroke, and deflection of beam No. 4 forms the middle stroke; the vertical stroke is made up of beams 1 to 7 inclusive. As will be discussed in greater detail below, appropriate logic means is employed to selectively control the beams to be on or off at respective scanning positions to form the desired characters.

FIGS. 4 and 5 depict further illustrative arrays which may be utilized. Thus, FIG. 4 shows a square array having sixteen beams while FIG. 5 shows a square array which is comprised of only 12 beams. Since it is required that the length and width of the square array be equal, in the embodiment of FIG. 5 the spacing of the beams in the three beam direction is greater than the spacing of the beams in the four beam direction. In the embodiments of both FIGS. 4 and 5, the square arrays are titled so as to ensure that no two beams are on the same horizontal scan line.

Figure 6:
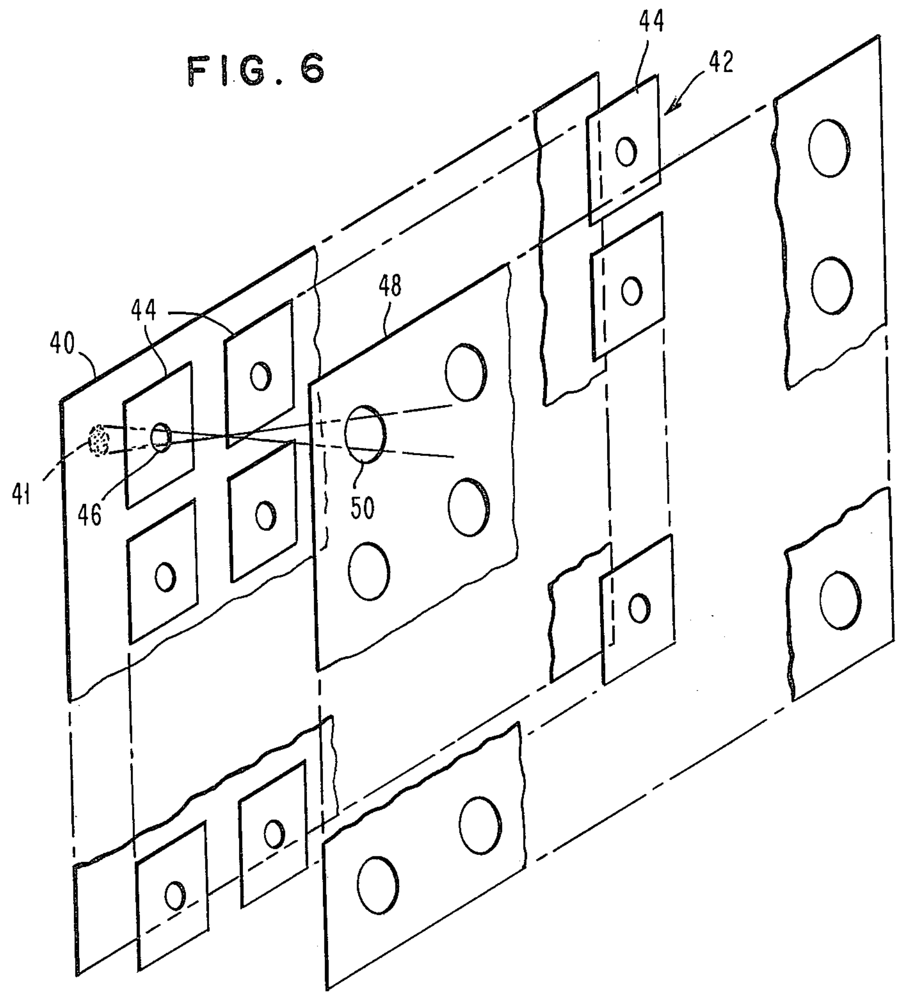
FIG. 6 is a schematic representation of cathode-grid structure which may be utilized in an embodiment of the present invention.

FIG. 6 is a schematic representation of an exemplary cathode-grid structure, partly cut away, which may be used to produce the array of beams shown in FIGS. 4 or 5. The structure is comprised of sheet cathode 40, control grid array 42, and shielding grid 48. Control grid array 42 is comprised of a plurality of plane metallic elements such as element 44, and shielding grid 48 is comprised of a unitary plane metallic element. Each of the two elements of the control grid array has an aperture such as aperture 46 therein while the unitary shielding grid has a plurality of apertures, such as aperture 50, which are in front of the apertures of the control grid array. The apertures of both grid units are arranged in a pattern which corresponds to the pattern of the desired electron beam array.

Several advantages are achieved by utilizing the expanded beam array of the invention. Because the beams are spaced a significant distance from each other, mutual beam repulsion is reduced and each of the beams including the top and bottom beam may be emitted in a straight line path. As can be seen in FIG. 6, the increased spacing allows more room to build and mount the control grids, and thus provides mechanical advantages over the conventional vertical straight line beam array arrangement. Also, the beams can be made larger in diameter and can therefore contain more current and beam intermodulation is minimized or avoided, thus resulting in effective grid control.

It is significant to note that the advantages of the present invention are obtained without substantially increasing the off axis abberations of the cathode ray tube. As is known, due to imperfections in the acceleration, focusing and deflection fields away from the axis of a CRT, beams which are located off axis experience abberations, which increase with distance from the axis. In the present apparatus, the number of beams utilized is determined by the desired height of the characters and the selected resolution of each beam. When a suitable two dimensional array pattern having comparable "length" and "width" dimensions is selected, the maximum off axis distance is no greater or only slightly greater than if a vertical straight line array were used. For example, the height of the 7 beam hexagon array shown in FIG. 3 is the same as the 7 beam straight line array of FIG. 1, while a diagonal of the 16 beam array of FIG. 4 is only slightly longer than a 16 beam vertical array. Arranging the above-mentioned dimensions of the array to be comparable ensures adequate spacing between electron beams, and it is noted that as used herein the term "comparable" as applied to dimensions, is to be construed as meaning dimensions wherein the shorter dimension is within 35% shorter than the longer dimension.

Further, it is to be understood that while the preferred embodiments of the invention have been illustrated in conjunction with the specific electron beam arrays shown in FIGS. 3 to 5, other specific arrays having each electron beam on a different scan line and having different geometric shapes than the arrays shown in FIGS. 3 to 5 in which the "length" and "width" dimensions are of comparable length are possible, and are also within the scope of the invention.

Figure 7:
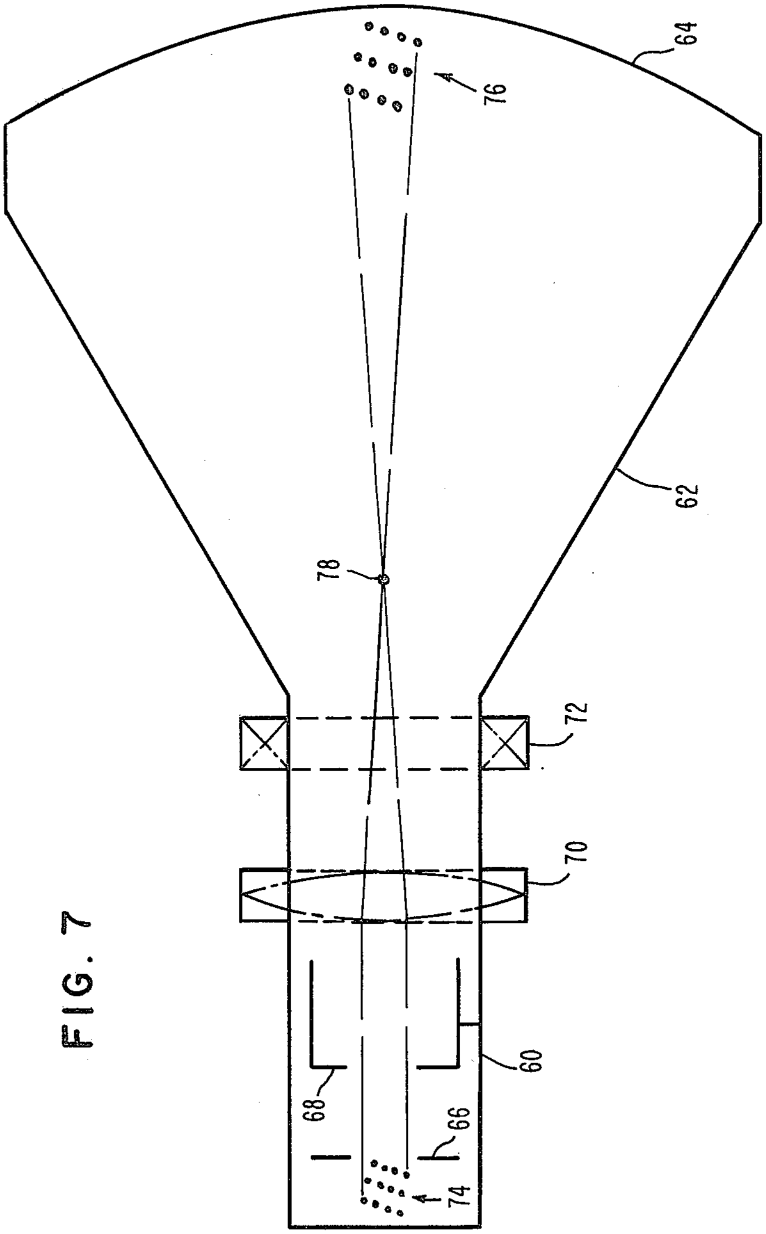
FIG. 7 is a schematic representation of a cathode ray tube, and illustrates how the expanded beam array of the present invention is focused on the screen of the tube.

FIG. 7 is a schematic representation of a cathode ray tube which incorporates the invention. The tube is comprised on an envelope consisting of neck 60, funnel 62, and screen 64. Shielding grid 66 and accelerator means 68 are disposed inside the neck of the tube while focusing means 70 and deflection means 72 are located around the neck. These components are all conventional, and are shown only for purposes of illustration.

In accordance with the invention, an array 74 of electron beams is shown behind shielding grid 66. The array, for example, could be produced by the illustrative grid-cathode structure shown in FIG. 6. The paths of some of the electron beams in the tube are shown in FIG. 7, and it is seen that an array of light "dots" 76, corresponding to the electron beam array is displayed on the screen. Since the beams converge and cross over at point 78, the image array is reversed with respect to the source of the array.

Figures 8, 9:
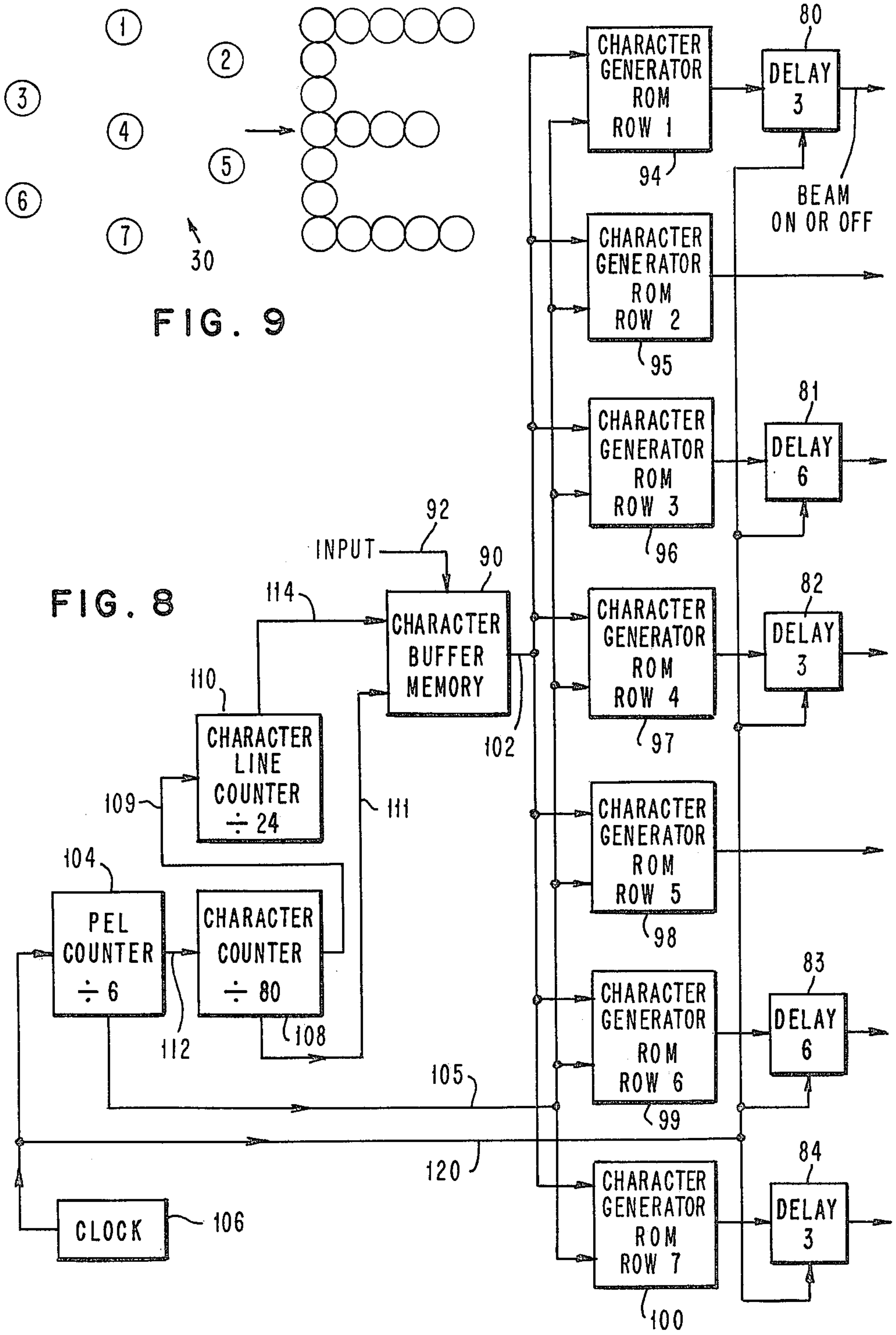
FIG. 8 is a block diagram of an illustrative logic system which may be used with the expanded beam array of the invention to form characters.
FIG. 9 is a schematic representation of the expanded beam array shown in FIG. 3 along with a showing of the beams scanned to form the letter E.

An illustrative logic system for displaying characters with the expanded arrays of the invention is shown in FIG. 8. The particular logic system shown is a modification of a logic system which is used to display characters with the vertical line array shown in FIG. 1. However, it is to be understood that the specific logic system illustrated is exemplary only, and that the other logic systems may be used.

For purposes of illustration, the operation of the logic of FIG. 8 is described in conjunction with the use of the hexagonal beam array shown in FIG. 3, for displaying the letter E. For ease of visualization, FIG. 9 depicts the hexagonal array of FIG. 3 juxtaposed with the letter E as displayed.

Referring to FIG. 8, it should be noted that the system illustrated, but without delay networks 80 to 84, may be used to display characters in a tube which uses the straight vertical line electron beam array depicted in FIG. 1. Delay networks 80 to 84 provide appropriate delay time for compensating for the offset of the beams in the expanded array from where these beams would be in a straight line array having the same number of beams.

Referring to FIG. 8, information indicative of alphanumeric characters to be displayed is fed into character buffer memory 90 on input lines 92. The buffer memory is a conventional unit which temporarily stores data, and outputs it to the remainder of the system at appropriate times.

A plurality of character generator read only memories equal in number to the number of beams in the array are provided. Referring to FIG. 8, memories 94–100 each correspond to a respective scan row of FIG. 9 as marked. Each character generator read only memory stores information for each character indicative of whether for each scanning position or picture element each beam should be on or off. Thus, referring to FIGS. 8 and 9, for the character E, character generator read only memory 94 which corresponds to row 1, stores information indicating that beam 1 is to be on for all five picture elements. In like fashion, for the character E, character generator read only memory 97 corresponding to row 4 stores information indicating that beam 4 is to be on for only the first four picture elements and the other read only memories corresponding to rows 2, 3, 5, 6 and 7 store corresponding information. Thus, if signals indicative of the particular character to be displayed and of the particular scanning position or picture element concerned is fed to the character generator read only memories, they provide a set of output signals for directly controlling the on-off beam control signal when a straight line beam array is used or for controlling it after appropriate delay times have been inserted when an expanded beam array is used.

A signal indicative of the character to be displayed is fed from character buffer memory 90 to inputs of each of the character generator read only memories on lines 102, while a signal indicative of the picture element is fed from picture element counter 104 to other inputs of each of the read only memories 105.

Picture element counter 104 is part of the display timing system which also includes clock 106, character counter 108, and character line counter 110. The clock 106 generates a series of timing pulses which are fed to picture element counter 104 which counts the number of picture elements in a character plus one space picture element between characters, before re-setting. For instance, the illustrative character of FIG. 9 has five picture elements and therefore including the one space picture element between characters, counter 104 counts to six before outputting a reset signal on line 112. The counter also outputs a count on line 105 for each count, and this count is fed to the character generator read only memories to indicate which picture element is to be addressed.

Reset line 112 or the picture element counter is fed to the input of character counter 108 which counts the number of characters on each line. In the illustrative embodiment, one scan line comprises 80 characters character positions, and counter 108 resets at a count of 80, feeding a signal on line 109 to character line counter 110. At the beginning of each character, counter 80 feeds the count on line 111 to character buffer memory 90 to cause it to feed a signal indicative of the next character to be displayed to the read only memories. Character line counter 110 counts the number of character lines in a frame and upon resetting, feeds the line count on leads 114 to buffer memory 96. As shown in the Figure, in the illustrative embodiment there are 24 lines in a frame.

As mentioned above, for the expanded beam array configuration, the outputs of at least some of the read only memories must be delayed before being used to control whether the beams are on or off. Thus referring to FIG. 9, as the beams are deflected across the screen, only beams 2 and 5 are in the correct positions to be directly controlled by the outputs of the memories. The beam on-off signals for the other beams must be delayed by a time which is proportional to the offset of the respective beams from the position of beams 2 and 5, so that the beams are at the proper scanning positions or picture elements when on-off control is effected.

Referring to FIG. 8, it is seen that since beam 1 is offset by three scanning positions or picture elements from beam 2, delay means 80 is arranged to delay the beam control signal fed from read only memory 94 by three picture elements. Similarly delay means 82 and 84 are provided to delay the beam control signals for beams 4 and 7 by three picture elements, while delay means 81 and 83 delay the control signals for beams 3 and 6 by six picture elements. All of the delay means are clocked by clock 106 to effect delays which are equal to discrete number of picture elements. It is thus seen that the logic system illustrated in FIG. 8 is effective to display characters using the expanded electron beam arrays of the invention.

It should be noted that while the invention finds primary use in cathode ray tubes and has been illustrated with respect thereto, it is not so limited, and can be employed in any application where a scanned electron beam pattern must be provided. For example, one such use would be in the field of semiconductor fabrication utilizing electron beam lithography, wherein electron beam patterns are written on semiconductor wafers.

Further, while the invention has been described in connection with certain preferred embodiments, it should be understood that I do not intend to be restricted thereto, but rather intend to cover all variations, modifications, and uses which come within the spirit of the invention, which is limited only by the claims appended hereto.

What is claimed is:

1. An apparatus for forming a scanned electron beam pattern which substantially avoids or reduces mutual beam repulsion, beam intermodulation, and grid mounting problems, comprising:

electron beam emitter means (40, 42) for emitting a plurality of electron beams which are disposed in relation to each other so as to form an array of beams, means for deflecting (72) each of said beams through a plurality of spaced apart, parallel scan lines, each said scan line being comprised of a plurality of successively disposed scanning positions, said array of beams being such that at any one time each beam lies on a different scan line and having a geometric shape such that a first line connecting the two points on the outline of said shape which are spaced furthest from each other and a second line perpendicular to and bisecting said first line and connecting two other points on said outline, are of comparable length, and means for selectively controlling each of said beams (80–120) at each of said scanning positions to effect said pattern.

2. The apparatus of claim 1 wherein said means for emitting said plurality of electron beams and said means for deflecting said beams are disposed in a cathode ray tube having a screen, (64) and further including means for accelerating (68) said emitted electron beams and means for focussing (70) said beams on said screen.

3. The apparatus of claim 2 wherein said array of electron beams is approximately symmetrical about a center point or centroid.

4. The apparatus of claim 3 wherein said array of electron beams is approximately square in shape.

5. The apparatus of claim 4 wherein said approximately square array of beams is comprised of an equal number of beams in mutually perpendicular directions.

6. The apparatus of claim 4 wherein said approximately square array of beams is comprised of an unequal number of beams in mutually perpendicular directions.

7. The apparatus of claims 5 or 6 wherein with said cathode ray tube in the operating position said screen has horizontal and vertical directions, and wherein said approximately square array is tilted with respect to said directions.

8. The apparatus of claim 2 wherein said array of electron beams is approximately hexagonal in shape.

9. The apparatus of claims 2 or 4 wherein said means for emitting said plurality of beams comprises the combination of a sheet cathode (40) and a plurality of spaced apart grid elements (42) disposed in front of said sheet cathode, each grid member having an aperture (46) therein, and said apertures being disposed in said array.

10. The apparatus of claim 9, including a further grid (48) disposed in front of said spaced apart grid elements, said further (50) grid being comprised of a single plane element having a plurality of apertures therein which are also disposed in said array.

11. The apparatus of claims 2 or 4 wherein said cathode ray tube includes means for automatically and repeatedly turning all of said beams on and off as they are deflected (42).

12. The apparatus of claim 11 wherein said means for selectively controlling each of said beams at each of said scanning positions comprises storage means (94–100) for storing information for each of a plurality of preknown patterns indicative of whether for each pattern each beam should be on or off at each of said scanning positions.

13. The apparatus of claim 12 wherein said storage means includes read only memory means (94–100).

14. The apparatus of claim 13 wherein said read only memory means stores information for each of said preknown patterns indicative of whether each of a hypothetical group of beams equal in number to said plurality of beams but arranged in a hypothetical straight line array, should be on or off at each of said scanning positions, and wherein said storage means further includes delay means (80-84) for each beam for delaying a beam on-off signal determined by means including said read only memory means for a number of scanning positions dependent on the offset of respective beams in said array from the hypothetical positions of corresponding beams in said hypothetical straight line array.

15. The apparatus of claim 14 further including clock means (106) for clocking said delay means as said beams are deflected.

16. A method of forming a scanned electron beam pattern which substantially avoids or reduces mutual beam repulsion, beam intermodulation, and grid mounting problems, comprising the steps of, emitting a plurality of electron beams which are disposed in relation to each other so as to form an array of beams, deflecting each of said beams through a plurality of spaced apart, parallel scan lines, each said scan line being comprised of a plurality of successively disposed scanning positions, said array of beams being such that at any one time each beam lies on a different scan line and having a geometric shape such that a first line connecting the two points on the outline of said shape which are spaced furthest from each other and a second line perpendicular to and bisecting said first line and connecting two other points on said outline, are of comparable length, and selectively controlling each of said beams at each of said scanning positions to effect said pattern.

* * * * *

UNITED STATES PATENT AND TRADEMARK OFFICE
CERTIFICATE OF CORRECTION

PATENT NO. : 4,353,061

DATED : October 5, 1982

INVENTOR(S) : Vernon Beck

It is certified that error appears in the above-identified patent and that said Letters Patent are hereby corrected as shown below:

Column 2, line 12, change "beng" to -- being --.

Signed and Sealed this

*Eighteenth* Day of *January 1983*

[SEAL]

*Attest:*

GERALD J. MOSSINGHOFF

*Attesting Officer* *Commissioner of Patents and Trademarks*